United States Patent [19]

Fluegel

[11] 3,710,376

[45] Jan. 9, 1973

[54] CALIBRATION OF ANALOG-TO-DIGITAL CONVERTER

[75] Inventor: Dale A. Fluegel, Bartlesville, Okla.

[73] Assignee: Phillips Petroleum Company, Bartlesville, Okla.

[22] Filed: June 22, 1970

[21] Appl. No.: 48,344

[52] U.S. Cl. .............340/347 CC, 235/197, 307/229

[51] Int. Cl. ....G06f 15/34, H03k 13/20, H03k 13/02

[58] Field of Search..340/347 AD, 347 CC; 324/120; 307/229; 235/197

[56] References Cited

UNITED STATES PATENTS

| | | | |
|---|---|---|---|
| 2,581,124 | 1/1952 | Moe | 307/229 X |
| 3,188,493 | 6/1965 | Malagari | 307/229 |
| 3,371,224 | 2/1968 | Polo | 307/230 X |
| 3,418,584 | 12/1968 | Birmingham | 307/229 X |
| 3,506,810 | 4/1970 | Katell | 307/229 X |
| 3,530,458 | 9/1970 | Willard et al | 340/347 CC |

*Primary Examiner*—Maynard R. Wilbur
*Assistant Examiner*—Thomas J. Sloyan
*Attorney*—Young and Quigg

[57] ABSTRACT

Analog signals are applied sequentially through a multiplexer and an analog-to-digital converter to a digital computer. The computer is programmed to check the zero point and the span of the converter periodically. Zero and reference voltages are applied to the multiplexer when these respective checks are made. Output signals from the computer are applied as feedback error signals to adjust the converter.

3 Claims, 3 Drawing Figures

INVENTOR.
D.A. FLUEGEL

BY Young & Quigg

ATTORNEYS

INVENTOR.
D. A. FLUEGEL
BY Young & Quigg
ATTORNEYS

CALIBRATION OF ANALOG-TO-DIGITAL CONVERTER

Increasing use is being made of digital computers in process control systems. Since process variables are usually measured in analog form, it is necessary to convert the analog signals into corresponding digital signals by means of an analog-to-digital converter. In order to insure that the converter is operating properly, it is desirable to check the calibration periodically. In field operations, this normally requires the use of rather elaborate test equipment and may result in the control system being shut down while the calibration check is being made.

In accordance with this invention, an improved system is provided for checking the calibration of analog-to-digital converters. The calibration can be carried out automatically using control signals from a computer. Apparatus is provided for calibrating both the zero point and span of the converter. Reference input signals representing zero and a predetermined span voltage are applied to the converter periodically when the the calibration operation is to be performed. These signals are converted to corresponding digital signals and applied to the computer. Output control signals from the computer are employed to adjust the analog-to-digital converter as may be necessary to compensate for any deviation from the desired output values.

In the accompanying drawing.

Figure 1:
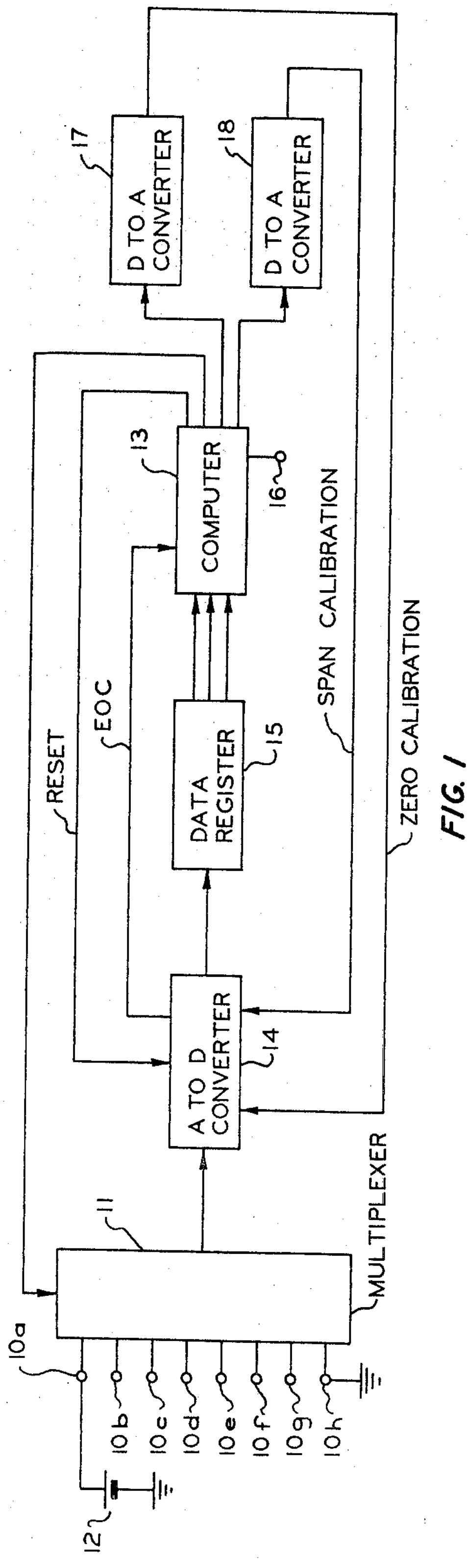
FIG. 1 is a schematic representation of a digital converter circuit having the calibration apparatus of this invention associated therewith.

Referring now to the drawing in detail and to FIG. 1 in particular, there are shown a plurality of input terminals 10*a* to 10*h*. These terminals are applied to the inputs of a multiplexer 11. A source of reference potential 12 of known magnitude is connected between terminal 10*a* and ground. Terminal 10*h* is connected directly to ground to apply a zero input potential. The remainder of the input terminals are adapted to be connected to suitable transducers which supply analog input signals representative of measured variables in a given process. The actual number of input terminals employed depends on the number of measurements to be made. In one specific use of the apparatus of this invention, the input signals to multiplexer 11 can represent process variables in a polymerization system wherein a heat balance is computed by the equations described in U.S. Pat. No. 3,078,265.

Multiplexer 11 is controlled by signals from a digital computer 13. These signals actuate the multiplexer so that the input signals are applied sequentially or in any predetermined pattern to an analog-to-digital converter 14. Converter 14 establishes output digital signals which correspond to the respective analog input signals received from multiplexer 11. These digital signals are transferred to a data register 15, such as a 16-bit data register, for example, and from there into computer 13. Computer 13 performs any desired operations, such as a computation of a heat balance in the manner described in the above-mentioned patent. Various types of suitable digital computers are well known and are available commercially. One such computer is described in British Pat. No. 749,836, published June 6, 1956. A suitable multiplexer is described in my U.S. Pat. No. 3,260,998, issued July 12, 1966. The resulting output signals are applied to suitable output terminals, such as represented schematically at 16. The output from computer 13 can represent computed data and/or suitable control signals if the computer is employed in a process control system. In the latter case, the output signals are usually applied through suitable digital-to-analog converters to control equipment, not shown.

In accordance with this invention, signals generated periodically by computer 13 are employed to calibrate analog-to-digital converter 14. To this end, a first signal is applied from computer 13 through a digital-to-analog converter 17 as a zero calibration signal. A second signal is applied through a digital-to-analog converter 18 as a span calibration signal. These signals are correlated in time with the signals applied to the multiplexer so that input terminal 10*a* is connected to converter 14 at a predetermined first time when the span calibration signal is transmitted to the converter and input terminal 10*h* is connected to converter 14 at a predetermined second time when the zero calibration signal is transmitted to the converter.

Figure 2:
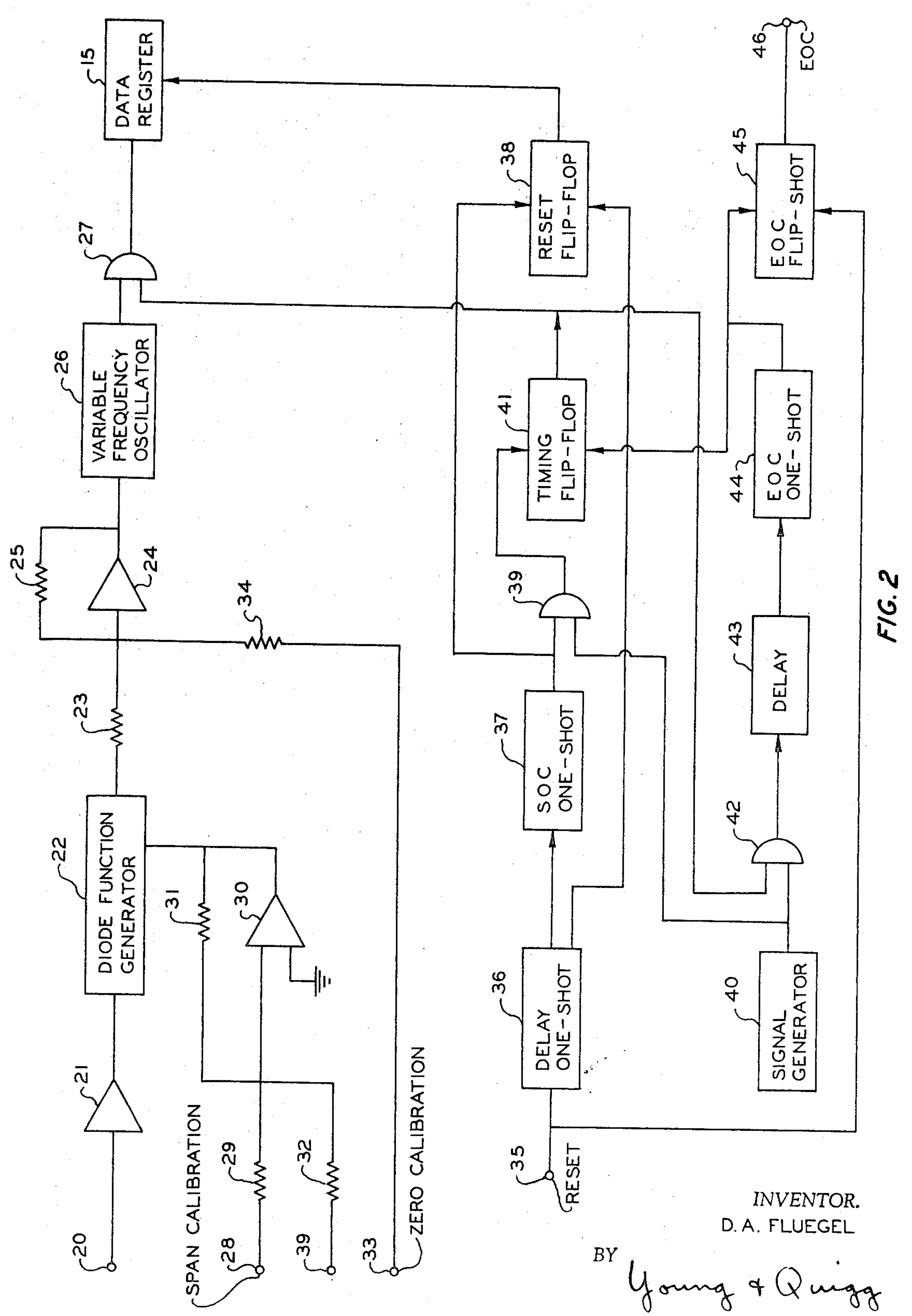
FIG. 2 is a schematic circuit drawing of the calibration apparatus of FIG. 1.

Converter 14 and the associated calibration apparatus is illustrated in greater detail in FIG. 2. Input terminal 20 receives the analog signal from multiplexer 11. This signal is applied through an inverter 21 to the input of a diode function generator 22. As will be described hereinafter in greater detail, the purpose of diode function generator 22 is to compensate for any non-linearity in the measuring apparatus. The output signal from function generator 22 is applied through a resistor 23 to the input of a summing amplifier 24, which is provided with a feed-back resistor 25. The output signal from amplifier 24 is applied to the input of a variable frequency oscillator 26, the frequency of which is regulated by the amplitude of the signal received from amplifier 24. The output of oscillator 26 is applied through a gate 27 to the input of data register 15.

The zero calibration signal from computer 13 is applied to a terminal 33 of FIG. 2 which is connected by an input resistor 34 to summing amplifier 24. The span calibration signal is applied to a terminal 28 which is connected by a resistor 29 to the input of a summing amplifier 30, which is provided with a feed-back resistor 31. A reference potential is applied to an input terminal 39 which is connected by a resistor 32 to the input of amplifier 30. The output of amplifier 30 is connected to function generator 22 in the manner to be described.

Computer 13 is programmed to reset converter 14 when an input analog signal is to be converted and transferred to the computer, and an end-of-count (EOC) signal is transmitted from converter 14 to the computer when the resulting digital signal has been stored in the data register. The reset signal from computer 13 is applied to a terminal 35 of FIG. 2 which is connected to the input of a delay one-shot multivibrator 36 and to the reset terminal of an EOC flip-flop 45. Multivibrator 36 provides a very short delay, such as of the order of one microsecond. The output signal from multivibrator 36 is applied to the reset terminal of a reset flipaflop 38. A second output signal from multivibrator 36 is applied through a SOC one-shot multivibrator 37 to the first input of a gate 39 and to the set terminal of flip-flop 38. A signal generator 40 establishes a reference signal at a relatively high frequency, such as one megacycle. This signal is applied to the second input of gate 39 and to the first input of a gate 42. The output of gate 39 is applied to the set terminal of a timing flip-flop 41. The output of flip-flop 41 is applied to the second input of gate 27 and to the second input of gate 42. The output of gate 42 is applied to the input of a delay circuit 43. This circuit can be a 10-bit gate generator, for example, which delays the signal by approximately 1,024 microseconds. The delayed output signal is applied through an EOC one-shot multivibrator 44 to the set terminal of flip-flop 45 and to the reset terminal of timing flip-flop 41. The output signal from flip-flop 45 is applied as the EOC signal to a terminal 46, which signal is applied to computer 13 of FIG. 1.

As previously mentioned, the output frequency of oscillator 26 is a function of the amplitude of the input voltage. The control circuit of FIG. 2 serves to open gate 27 for a predetermined time interval, the length of the delay supplied by network 43, so that the number of pulses applied to register 15 is a function of the frequency of oscillator 26, and thus the amplitude of the input analog signal. When it is desired to transmit an input signal to the computer, a reset signal is applied to terminal 35. This signal is transmitted through multivibrator 36 to reset flip-flop 38, the output of which resets data register 15. After a very short time delay (1 microsecond), flip-flop 38 is set by the output signal from multivibrator 37. This same signal is applied through gate 39 to set timing flip-flop 41 and thereby open gate 27 so that data register 15 begins to accumulate output pulses from oscillator 26. When an output signal is received from delay network 43, multivibrator 44 resets timing flip-flop 41 to close gate 27. Thus, the pulses transmitted to register 15 are those pulses received during the timing interval of delay network 43. At this same time, an EOC signal is transmitted back to the computer to notify the computer that the input analog signal has been applied to register 15 as a series of pulses.

Figure 3:
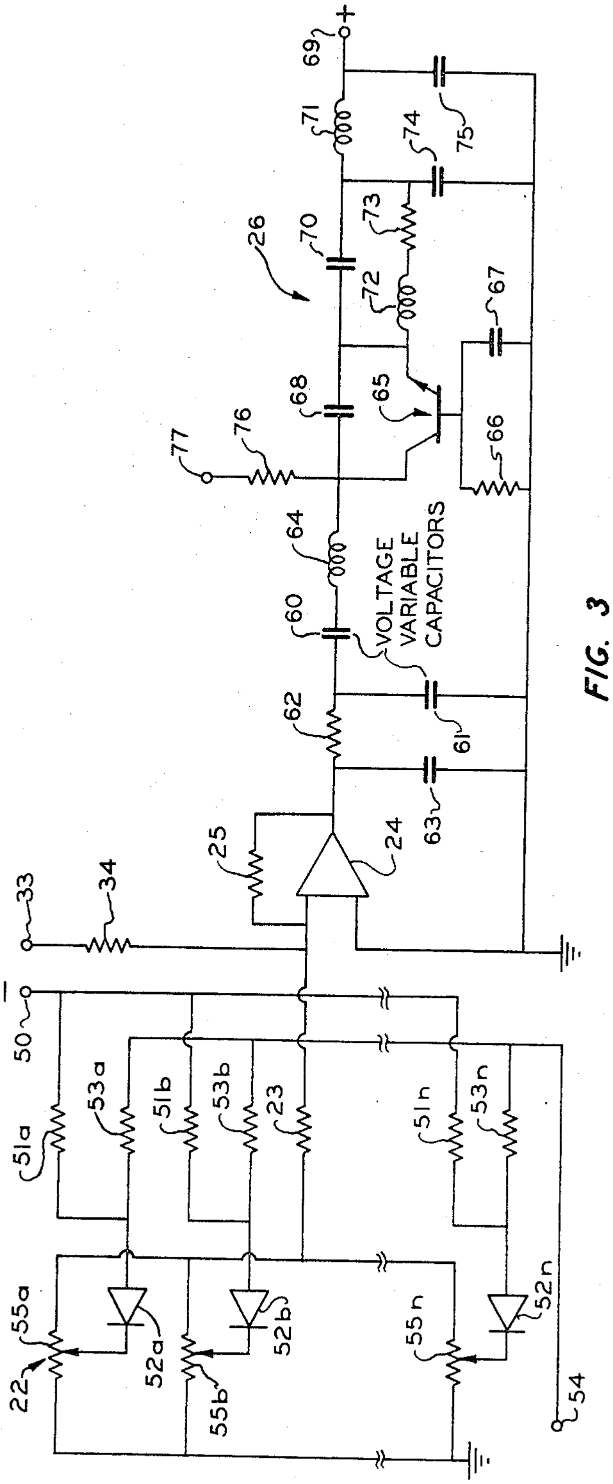
FIG. 3 illustrates an embodiment of the analog-to-digital converter employed in the system of FIG. 1.

Diode function generator 22 and variable frequency oscillator 26 are illustrated in FIG. 3. The first terminals of a plurality of first resistors **51*a*, 51*b* . . . 51*n* are connected to a terminal 50 which is connected to a source of negative potential, not shown. The second terminal of resistor 51*a* is connected to the junction between a rectifier 52*a* and a second resistor 53*a*. The second terminal of resistor 53*a* is connected to an input terminal 54 which receives the output signal from amplifier 30 of FIG. 2. The second terminal of diode 52*a* is connected to the contactor of a potentiometer 55*a*. The first end terminal of potentiometer 55*a* is connected to ground. The second end of potentiometer 55*a* is connected through input resistor 23 to summing amplifier 24. Corresponding circuit elements are associated with resistors 51*b* to 51*n***, as illustrated.

Diode function generator 22 serves to compensate for any non-linearity which may be present in the circuit which includes the analog signal generating transducer elements, not shown, and oscillator 26. This generator can be adjusted so that the output signal represents a desired non-linear function of an input voltage. This is accomplished by the selection of the bias voltages on the diodes as determined by the positions of the contactors of the potentiometers. The overall magnitude of the output signal is a function of the voltage applied to terminal 54, which is a positive voltage.

Variable frequency oscillator 26 includes first and second voltage variable capacitors 60 and 61. The capacitances of these elements change in accordance with the voltages applied across the elements. The output of summing amplifier 24 is connected to the first terminal of a resistor 62 and to the first terminal of a capacitor 63. The second terminal of resistor 62 is connected to first terminals of capacitors 60 and 61. The second terminals of capacitors 61 and 63 are connected to ground. The second terminal of capacitor 60 is connected by an inductor 64 to the collector of a transistor 65. The base of transistor 65 is connected to ground by a resistor 66 and a capacitor 67 which are connected in parallel. A capacitor 68 is connected between the emitter and the collector of transistor 65. The emitter of transistor 65 is connected to a potential terminal 69 by a capacitor 70 and an inductor 71. An inductor 72 and a resistor 73 are connected between the emitter of transistor 65 and inductor 71. Capacitors 74 and 75 are connected between the respective end terminals of inductor 71 and ground. A resistor 76 is connected between the collector of transistor 65 and the output terminal 77 of the oscillator. Terminal 77 is connected to gate 27 of FIG. 2. The frequency of the output signal from oscillator 26 is a function of the amplitude of the signal received from function generator 22.

Computer 13 can be programmed so that the zero and span checks are made periodically at any desired frequency. The amplitudes of the signals from converters 17 and 18 are calibrated so that the zero and span calibration signals applied to converter 14 serve to adjust the converter as may be necessary to correct for any errors. Converters 17 and 18 serve as signal storage means to apply the generated error signals continuously until a subsequent calibration check is made.

While this invention has been described in conjunction with a presently preferred embodiment, it obviously is not limited thereto.

What is claimed is:

1. Signal conversion and calibration apparatus comprising:

a multiplexer having a plurality of input terminals which are adapted to receive analog signals;

an analog-to-digital converter connected to the output of said multiplexer, said converter including a function generator which is adapted to provide an output signal which is a predetermined function of the amplitude of an input signal applied thereto, and first and second means to adjust the amplitude of the output signal from said function generator, said function generator comprising, a plurality of diodes, a plurality of potentiometers having respective first and second end terminals and adjustable contactors to permit establishment of a non-linear transfer characteristic from the function generator, a plurality of first resistors, a plurality of second resistors, means connecting corresponding first end terminals of said potentiometers to a point of reference potential, means to apply a potential representative of an output signal from said converter to first end terminals of said first resistors, means connecting respective ones of said diodes between second and terminals of respective ones of said first resistors and the contactors of respective ones of said potentiometers, a source of third potential, means connecting said second resistors between said source of third potential and the junctions between respective ones of said first resistors and respective ones of said diodes, and means connecting the second end terminals of said potentiometers to a common output terminal;

means to connect a first input terminal of said multiplexer to a point of reference potential;

a source of second potential of predetermined magnitude connected to a second input terminal of said multiplexer to apply a calibration voltage;

means to control said multiplexer to apply signals received at the input terminals of the multiplexer sequentially to said converter;

means responsive to the output of said converter to regulate said first means to adjust at a predetermined first time to provide an output signal from said function generator of first preselected amplitude when said reference potential is applied to the input of said converter; and means responsive to the output of said converter to regulate said second means to adjust at a predetermined second time to provide an output signal from said function generator of second preselected amplitude when said second potential is applied to the input of said converter, whereby the system gain and drift are stabilized and input transducer non-linearity is compensated.

2. The apparatus of claim 1 wherein said function generator further includes a variable frequency oscillator connected to the output of said function generator, the frequency of said oscillator being a function of the amplitude of an input signal applied thereto, and means to apply the output signal from said function generator to the input of said oscillator.

3. The apparatus of claim 1 wherein said variable frequency oscillator has voltage variable capacitors connected therein so that the output signal from said function generator is applied to said capacitors.

* * * * *